B RICKETSON & A. B. SMITH.
CART.
No. 43,549. Patented July 12, 1864.
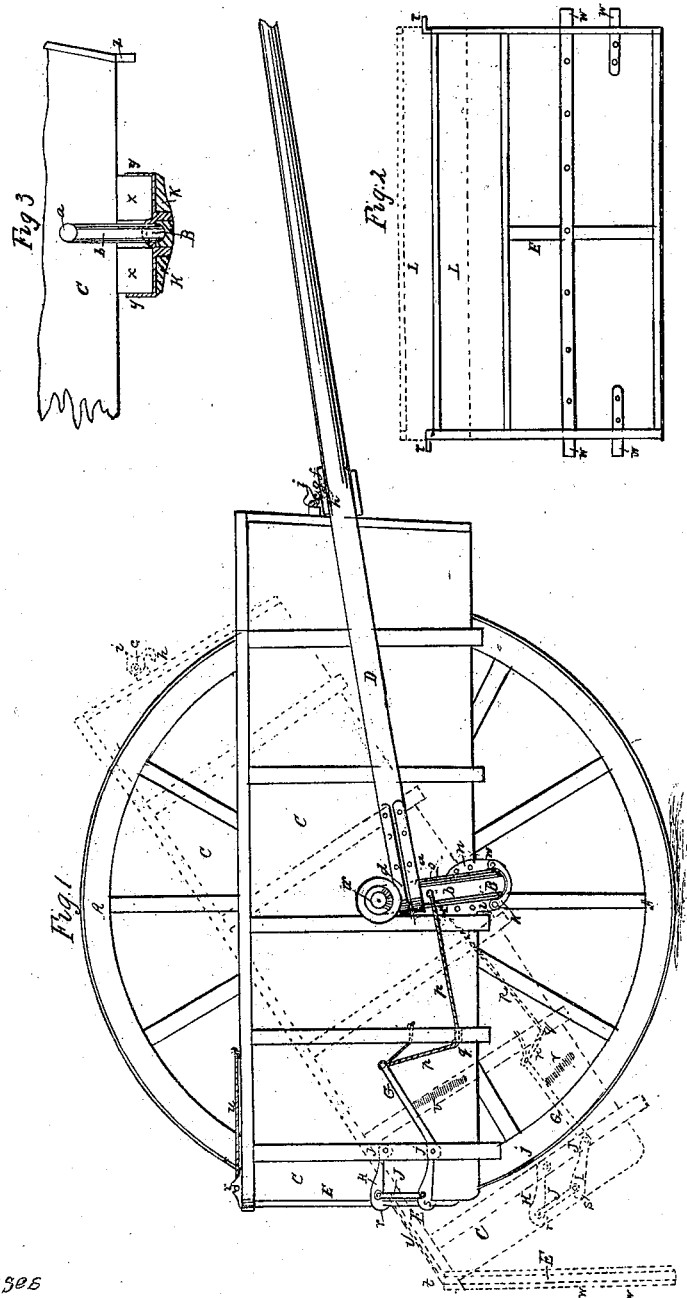

UNITED STATES PATENT OFFICE.

A. B. SMITH, OF CLINTON, PENNSYLVANIA, AND BARTON RICKETSON, OF NEW BEDFORD, MASS., ASSIGNORS TO BARTON RICKETSON,

IMPROVEMENT IN CARTS.

Specification forming part of Letters Patent No. 43,549, dated July 12, 1864.

*To all whom it may concern:*

Be it known that we, A. B. SMITH, of Clinton, in the county of Allegheny and State of Pennsylvania, and BARTON RICKETSON, of New Bedford, in the county of Bristol and State of Massachusetts, have invented a new and Improved Cart; and we do hereby declare that the following is a full and exact description thereof, reference being had to the accompanying drawings, making part of this specification.

Figure 1 is a side view of a cart constructed with our improvements, the near wheel being removed, and the cart-body being shown in two positions; Fig. 2, a rear view of the tail-board of the cart; Fig. 3, a detached view representing a modification of the method of mounting the cart-body on the axle.

Like letters designate corresponding parts in all of the figures.

We employ a bent or double-crank-shaped axle, B, the journals $a\ a$ of which being connected with the main portion by right-angle portions $b\ b$, of sufficient length to bring the cart body C down as low as desired, while the wheels A A are as large as may be useful.

In order to bring the cart-body C down as low as required, irrespective of the position of the thills D D, and that the draft-line may be at the right height to draw to the best advantage, the said thills are situated at the sides of the cart-body, which is located between the two, and lower down, substantially as shown. The thills are secured to the upright portions $b\ b$ of the bent axle, at any part thereof required, by straps $d\ d$, or their equivalents. The thills are connected in front of the cart-body by a cross-bar, $f$, to which the whiffletree is secured, or the traces, if no whiffletree is used. The front end of the cart-body has suitable projections whereby to rest upon the cross-bar.

We employ an improved device for securing the front end of the cart-body to the cross-bar $f$, consisting of a self-fastening hook, $c$, substantially of the form shown in Fig. 1, being provided with a suspended hook portion, $h$, which enters an aperture, $g$, in the cross-bar, and holds beneath one edge of the same. It is also provided with a projecting ear or handle, $i$, by which it is disengaged when required to dump the cart. The cart-body has bearings $n\ n$, which rest on the main or low part of the axle, so as to turn freely around the same. Straps $k\ k$, hinged at one end to the bearings, as at $m$, Fig. 1, and fastened thereto at the other end by a removable pin, $l$, or its equivalent, enable the cart-body to be readily removed from the axle and mounted thereon at pleasure.

In Fig. 1 no springs are represented for the cart-body to rest upon.

We generally employ a slightly modified method of mounting the body on the axle when springs are used, as indicated in Fig. 3. Here blocks $x\ x$, of india-rubber, are secured under the cart-body, and a bearing, $y$, embraces the springs, substantially as shown. There may also be a spring bolster-block, $z$, under the front end of the cart-body for that end to rest upon.

There are important advantages gained by the use of the bent axle B with the cart-body not only resting upon its low portion, but also turning thereon freely. Not only can larger wheels be used, and the cart be brought as low as desired, and the draft-line be located at the proper height, as mentioned above, but the arrangement is properly adapted in all respects to all circumstances connected with the use of the cart. Thus, in ascending a hill, the axle always hangs or tends to hang vertically from the wheel-boxes, and thus to cause the forward end of the cart to bear rather more than usual, so as to bear also somewhat on the horses' necks—the reverse of the inconvenient case, according to the ordinary arrangement of carts, or when a bent axle is used, on which the cart-body does not turn. On the other hand, in descending a hill, the same tendency of the axle to become suspended vertically from the wheels, while turning freely in the bearings of the cart-body, causes the front end of the cart to bear rather less than usual on the horses' necks instead of more, according to other arrangements so objectionable in this particular. Again, in dumping the cart, if the axle is bent, and the cart-body cannot turn thereon, as in other arrangements, when the cart is dumped, since the axle has to turn with the cart-body on the axle-journals as centers, the whole weight of the cart and its contents has to be lifted considerably, so that it is very difficult to dump heavy loads with such carts; but with the cart-body turning on the axle itself the operation of dumping is just as easy as it can be. Another use we make of the crank-shaped axle, with the cart-body turning thereon, is that thereby we are enabled to set the tail-board E free in the act of dumping. We accomplish this substantially in the following manner: The tail-board is suspended in bearings at the top, as at $t$, and this suspension may be such as to enable it to be readily removed entirely from its bearings, yet it is kept in place, from falling out, by cords $u$ $u$, or their equivalents, substantially as shown. On these bearings $t$ $t$, as centers, the tail boards swings outward and shuts inward, as shown in Fig. 1. It is held shut or closed by means of straps or latch projections $w$ $w$, extending outward by the sides of the cart, and of a catch, I, or, better, a pair of catches, H I, hinged to the cart, as at $j$ $j$, and to each other by a connecting-rod, J, making a jointed quadrangle, substantially as represented. These catches are made to spring automatically over the latch projections $w$ $w$ by a spring or springs, $v$, duly acting thereon. One of the catches, I, has an arm, $g$, extending forward (against which the said spring $v$ conveniently acts) in such a manner, and is connected by a cord, $p$, or its equivalent, through a loop, $q$, or around a a pulley there, with the vertical portion $b$ of the axle at such a height above the low portion thereof, around which the cart-body turns, that, in the act of dumping, the distance between the points of the cord's attachment respectively to the catch-arm and the axle is lengthened sufficiently to draw upon said catches and release them from the latch projections, substantially as shown by red lines in Fig. 1. The tail-board thus set free, the lower edge swings out by its own weight, as shown in red lines. When the cart is again raised to an upright position, as indicated by black lines in the same figure, the tail-board swings into place, and the cord $p$, ceasing to be drawn upon by the axle, allows the catches to spring down and secure the tail-board in place again.

For convenience, the upper part, L, of the tail-board is inserted in grooves in the lower part, so that it can be removed separately, as indicated by red lines in Fig. 2.

What we claim as our invention, and desire to secure by Letters Patent, is—

1. The combination and arrangement of the bent axle B, the thills D D, attached to the vertical portions of said axle, and the cart-body C, turning on the low portion of the axle within the thills, substantially as and for the purposes herein specified.

2. Controlling the tail board, so as to open and close the same automatically, by connecting its fastenings with the bent axle, so as to be operated thereby in the act of dumping the cart, substantially as herein specified.

3. In combination with the self-acting tail-board, as set forth, the removable portion L and securing-cords $u$ $u$, as described.

In witness that the above is a true specification of our improved cart we hereunto set our hands this 13th day of May, 1862.

A. B. SMITH.
    BARTON RICKETSON.

Witnesses:
 J. S. BROWN,
 EDM. F. BROWN.